United States Patent
Meredith et al.

(10) Patent No.: US 11,128,753 B2
(45) Date of Patent: Sep. 21, 2021

(54) INTERCEPTING AND CHALLENGING UNWANTED PHONE CALLS

(71) Applicants: AT&T Intellectual Property I, L.P., Atlanta, GA (US); AT&T Mobility II LLC, Atlanta, GA (US)

(72) Inventors: Sheldon Meredith, Roswell, GA (US); Brandon Hilliard, Canton, GA (US); Zachary Meredith, Roswell, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 16/526,256

(22) Filed: Jul. 30, 2019

(65) Prior Publication Data

US 2021/0037135 A1    Feb. 4, 2021

(51) Int. Cl.
*H04M 3/436* (2006.01)

(52) U.S. Cl.
CPC .... *H04M 3/436* (2013.01); *H04M 2203/2027* (2013.01)

(58) Field of Classification Search
CPC .................. H04M 3/436; H04M 2203/2027
USPC ................................................ 379/210.02
See application file for complete search history.

(56) References Cited

U.S. PATENT DOCUMENTS

| | | | |
|---|---|---|---|
| 5,752,230 A * | 5/1998 | Alonso-Cedo | H04M 1/271 704/270 |
| 7,295,660 B1 | 11/2007 | Higginbotham et al. | |
| 8,634,520 B1 | 1/2014 | Morrison et al. | |
| 8,942,357 B2 | 1/2015 | Goulet | |
| 9,210,559 B2 | 12/2015 | Edwards et al. | |
| 9,386,149 B2 | 7/2016 | Kom | |
| 2007/0150279 A1* | 6/2007 | Gandhi | G10L 13/08 704/258 |
| 2010/0158233 A1* | 6/2010 | Caceres | H04M 3/436 379/207.02 |
| 2017/0180551 A1* | 6/2017 | Liu | H04M 3/436 |

* cited by examiner

*Primary Examiner* — Ahmad F. Matar
*Assistant Examiner* — Jirapon Intavong
(74) *Attorney, Agent, or Firm* — Amin, Turocy & Watson, LLP

(57) ABSTRACT

A call challenger can receive a user input from a called party identity to opt-in to a call challenge service, and a second user input of a keyword. When the call challenger receives a call directed to a user equipment of the called party identity, the call challenger can prompt the calling party to provide an audible response. In response to a receipt of the audible response, the call challenger can convert the audible response to a text. The call challenger can compare the text with the keyword to determine if there is a sufficient match. In response to the determining the output of the comparing does not satisfy a threshold match score, the call challenger can prevent the call from connecting with the user equipment.

20 Claims, 14 Drawing Sheets

900

YOUR KEYWORD: sheldon

| Calling Party | Keyword Provided | Disposition | Treatment of next call | |
|---|---|---|---|---|
| Vax Potor | sheldon | allowed | (block) ☑ | |
| Camground Workers of America | --- | blocked | (allow) ☑ | |
| Judy Jones | showden | blocked | (allow) ☑ | (add keyword variation) ☑ |

Submit

FIG. 9

INTERCEPTING AND CHALLENGING UNWANTED PHONE CALLS

TECHNICAL FIELD

The present application relates generally to the field of privacy, and, for example, intercepting and challenging unwanted phone calls.

BACKGROUND

Most telephones, fixed or mobile, appear to be getting regular unwanted (e.g., "SPAM") calls for everything from back pain and insurance to business loans and prayers. Mobile networks are suffering direct impacts from wasted radio-frequency (RF) resources (e.g., increased communications load on the mobile network). Telecommunications customers are upset with telemarketer calls, which sometimes occur multiple times a day. Also, for mobile devices, increased frequency in calls can also lead to more energy consumption by the mobile device, which can impact the mobile device's battery charge. There has been an increase in the number of robocalls, in which numerous calls are automatically directed to called parties by a robocall device (also referred to as a robocall system, automated calling system, automated dialing system, robotic caller, robocaller, robocalling device, robocalling system, predictive dialer, robodialer, robodialing device, robotic calling device, etc.). The robocall device typically plays a pre-recorded message for the called parties that answer the call. These calls can be vexatious, or even fraudulent. In addition to hiding the robocalls calling line identification (e.g., caller identification), there are many ways to mask a robocall as a legitimate call by "spoofing" the originating number, such that the robocall appears to a blocking system, as well as to called party identities, as coming from a legitimate caller or legitimate source.

There has been some effort in the United States (U.S.) to reduce and even limit such unwanted calls by enforcing the laws in which numbers placed on a "do not call" list are not be called. However, most robocalls do not even originate from the U.S. There are large call centers in remote corners of the world where U.S. laws are inapplicable, or the calling parties simply ignore the applicable laws. Additionally, there have been incidences in which robocall systems have been used maliciously to perpetrate fraudulent transactions. According to the federal communications commission (FCC), it received more than 214,000 complaints about unwanted calls in 2014, and a recent New York Times article mentioned that customers were "besieged by nearly five billion unwanted robocalls from telemarketers and scammers" in May of 2019. Congress on Jun. 20, 2019 introduced a bipartisan bill aimed at reducing unwanted phone calls.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 9 illustrates an example GUI comprising a feedback report, in accordance with various aspects and embodiments of the subject disclosure.

DETAILED DESCRIPTION

Figure 1:
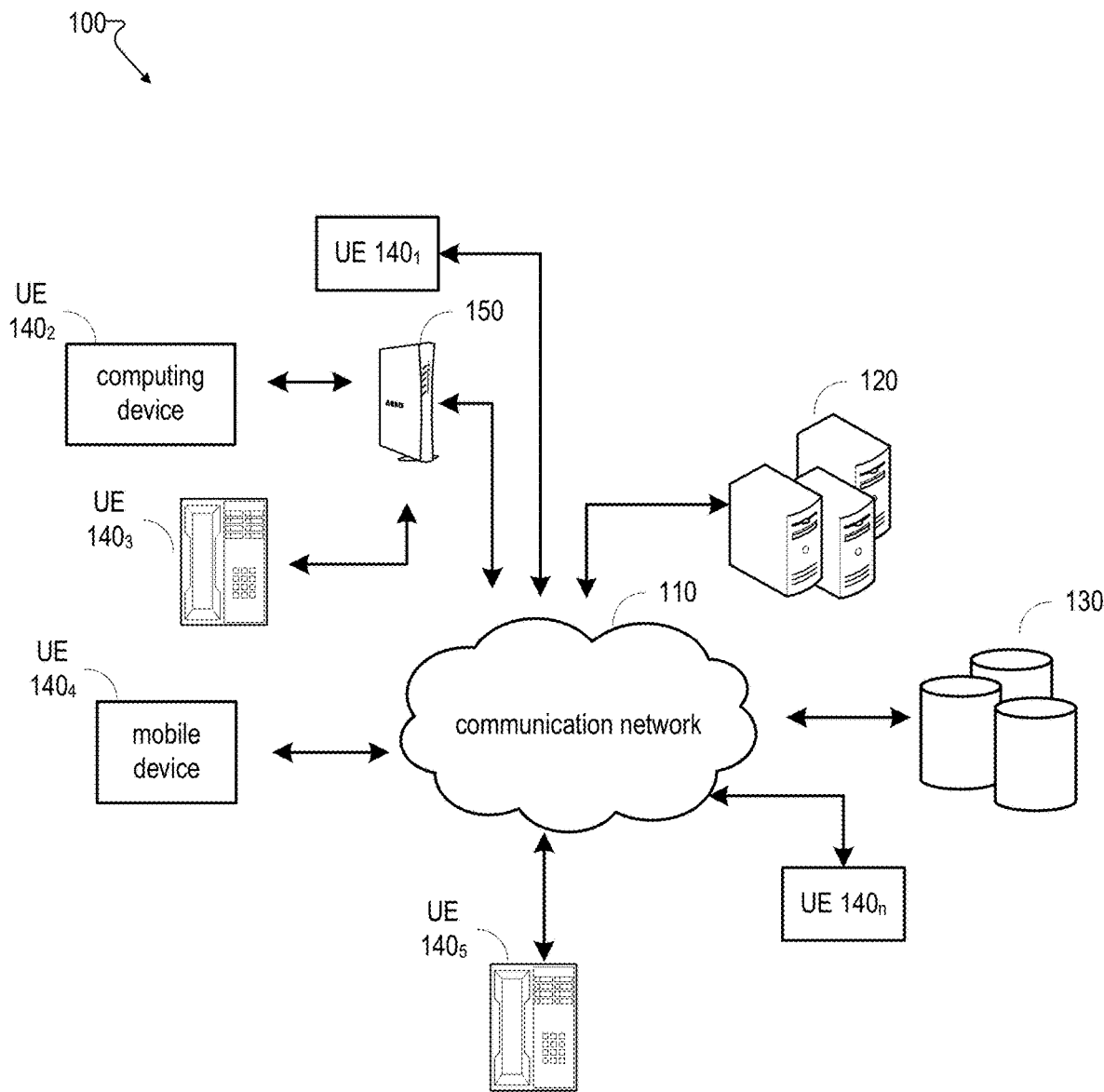
FIG. 1 is a diagram illustrating an example telecommunications and networking environment.

The subject disclosure is now described with reference to the drawings, wherein like reference numerals are used to refer to like elements throughout. The following description and the annexed drawings detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth to provide a more thorough understanding of the subject disclosure. It might be evident, however, that the subject disclosure can be practiced without these specific details. In other instances, well-known structures and devices are shown in block diagram form to facilitate describing the subject disclosure.

The subject disclosure of the present application describes systems and methods (comprising example computer processing systems, computer-implemented methods, apparatus, computer program products, etc.) for processing a call. The methods (e.g., processes and logic flows) described in this specification can be performed by devices comprising programmable processors that execute machine-executable instructions to facilitate performance of the operations described herein. Examples of such devices are described in the figures herein and can comprise circuitry and components as described in FIG. 13 and FIG. 14. Example embodiments and components can take the form of an entirely hardware embodiment, an entirely software embodiment, or an embodiment combining software and hardware aspects.

Example embodiments are described below with reference to block diagrams and flowchart illustrations of methods, apparatuses, and computer program products. Steps of the block diagrams and flowchart illustrations support combinations of mechanisms for performing the specified functions, combinations of steps for performing the specified functions, and program instructions for performing the specified functions. Example embodiments may take the form of web, mobile, wearable computer-implemented, computer software. It should be understood that each step, or block, of the block diagrams and flowchart illustrations, combinations of steps in the block diagrams and flowchart illustrations, or any functions, methods, and processes described herein, can be implemented by a computer executing computer program instructions. These computer program instructions may be loaded onto a general-purpose computer, special purpose computer, combinations of special purpose hardware and other hardware, or other programmable data processing apparatus. Example embodiments may take the form of a computer program product stored on a machine-readable storage medium comprising executable instructions (e.g., software) that, when executed by a processor, facilitate performance of operations described herein. Any suitable machine-readable storage medium may be utilized including, for example, hard disks, compact disks, DVDs, optical data stores, and/or magnetic data stores.

The present application describes systems and methods relating to a call challenger comprising one or more processors and one or more memories that can store executable instructions that, when executed by a processor, facilitate the blocking of unwanted calls. A user identity can opt-in to a call challenge service. A call challenger (e.g., which can be considered a device or system) can receive a call from a communication device directed to a user equipment (UE) associated with the user identity. The call challenger can prompt the calling party to provide an audible response. In response to a lack of receipt of the audible response (or lack of receipt of an audible response within a certain period), the call challenger device can take a preventative action relating to the call. In response to the receipt of the audible response, the call challenger can convert the audible response to text. In response to a comparison of the text with a keyword provided by the user identity, the call challenger can allow the call to proceed to the user equipment. In response to the comparing resulting in a threshold match score not being attained, the call challenger device can facilitate taking a preventative action relating to the call. Other aspects and features will be described below.

FIG. 1 is a diagram illustrating an example system 100 in which a user equipment (UE) can make or receive phone calls, such as make phone calls from a device owned by a calling party identity to a device owned by a called party identity. The system 100 can comprise one or more communications networks (e.g., communication network 110, and as mentioned below with respect to FIG. 5, can comprise a calling party's network 510 and a called party's network 520), one or more servers 120, one or more data stores 130 (each of which can contain one or more databases of information), and one or more UEs $140_{1-N}$. The servers 120 and user equipment 140, which can be computing devices as described in FIG. 13 and FIG. 14, can execute software modules that can facilitate various functions, methods, operations, and processes described herein.

In example embodiments, the one or more communications networks can be operable to facilitate communication between the server(s) 120, data store(s) 130, and UEs 140. The one or more networks (e.g., communication network 110) may include any of a variety of types of wired or wireless computer networks such as a cellular network, private branch exchange (PBX), private intranet, public switched telephone network (PSTN), plain old telephone service (POTS), satellite network, WiMAX, data over cable network (e.g., operating under one or more data over cable service interface specification (DOCSIS)), or any other type of computer or communications network. The communications networks can also comprise, for example, a local area network (LAN), such as an office or Wi-Fi network.

Referring to FIG. 1, the communication network 110 can be a cellular network employing various cellular technologies and modulation schemes to facilitate wireless radio communications between devices. For example, communication network 110 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, and citizens broadband radio system (CBRS). In example embodiments, communication network 110 can be configured to provide and employ 5G wireless networking features and functionalities. 5G wireless communication networks are expected to fulfill the demand of exponentially increasing data traffic and to allow people and machines to enjoy gigabit data rates with significantly reduced latency.

Still referring to FIG. 1, the communication network 110 can comprise a fixed-packet network. The fixed packet network can be a broadband network using internet protocol (IP) to deliver video, voice, and data. An example of such a network is a cable television (CATV) infrastructure implementing the data over cable service interface specification (DOCSIS) and PacketCable standards, which allow a multiple service operator (MSO) to offer both high-speed internet and voice over internet protocol (VoIP) through an MSO's cable infrastructure. In some implementations, the fixed packet network can have headend equipment such as a cable modem termination system (CMTS) that communicates through one or more hybrid fiber coax (HFC) networks with user premises equipment such as a cable modem or embedded multimedia terminal adapter (EMTA) (see below). The fixed packet network can also comprise networks using asynchronous transfer mode (ATM), digital subscriber line (DSL), or asymmetric digital subscriber line (ADSL) technology. These networks have typically been provided by telephone companies. ATM and DSL/ADSL equipment can be located at an exchange or central office, and can include integrated DSL/ATM switches, multiplexers such as digital subscriber line access multiplexers (DSLAMS), and broadband remote access servers (B-RAS), all of which can contribute to the aggregation of communications from user equipment onto a high-capacity uplink (ATM or Gigabit Ethernet backhaul) to internet service providers (ISPs). Transmission media connecting the central office and user equipment can include both twisted pair and fiber.

The communication network 110 can also comprise one or more satellite networks, which can enable the exchange of voice, data, and video. In addition to television programming services, satellite networks, such as a DBS (Direct Broadcast Satellite) system, operated by DBS broadcast satellite providers (e.g., Dish Networks, DIRECTV, Hughes-Net), can be operable to enable high speed internet and voice services.

The communication network 110 can also comprise a POTS network that supports the delivery of voice services employing analog signal transmission over copper loops.

Figure 8:
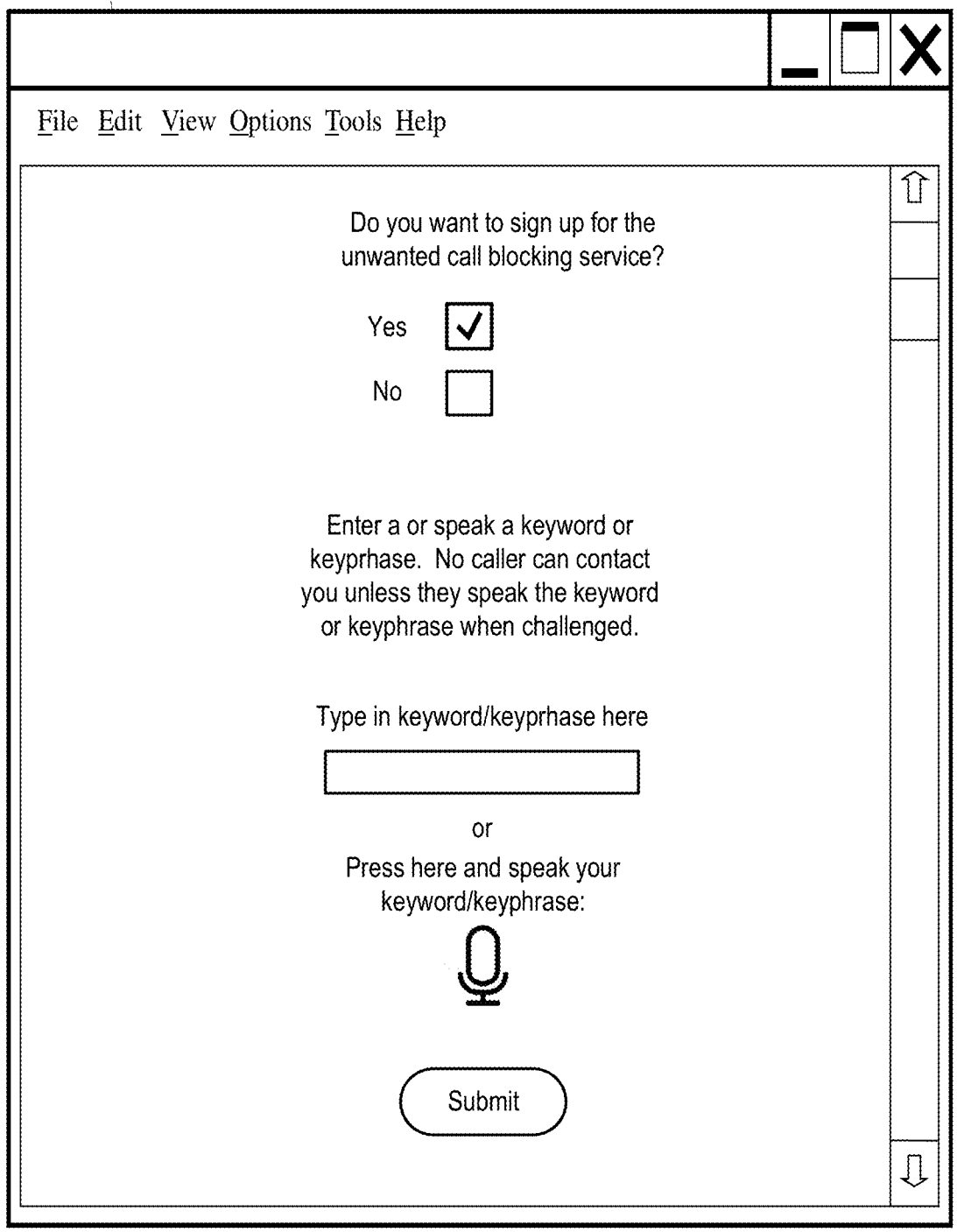
FIG. 8 illustrates an example graphical user interface (GUI) for entry of an opt-in input and entry of a keyword, in accordance with various aspects and embodiments of the subject disclosure.

Referring to FIG. 1, servers 120 can be operable to send via communication network 110 executable code capable of generating graphical user interfaces (GUIs) that a user identity can interact with to facilitate the provision of such on-line data, or voice services. The GUIs can be, for example, a webpage that can be displayed (and interacted with) on a user equipment 140 (e.g., as shown in FIG. 8 and FIG. 9). Modules comprising executable instructions that, when executed by a processor of the server 120, facilitate performance of operations, such as the exchange of data or the exchange of voice (e.g., a soft phone), can be stored on a memory device of the server 120 (or a memory device connected to the server 120).

The data stores 130 can comprise physical media for storing information, housed within the one or more servers 120, peripherally connected to the one or more servers, or connected to the servers 120 through one or more networks. For example, the storage device can be connected to the processor of a server, via, for example, a communications medium such as a bus (e.g., SATA, eSATA, SCSI, flash, or the like). As another example, data stores 130 can be peripheral devices, set up as a redundant array of independent disks (RAID) array, a storage area network (SAN), or network attached storage (NAS). The data stores can comprise magnetic memory, such as a hard drive or a semiconductor memory, such as Random-Access Memory (RAM), Dynamic RAM (DRAM), non-volatile computer memory, flash memory, or the like. The memory can include operating system, administrative, and database program modules that support the methods and programs disclosed in this application.

Referring to FIG. 1, user equipment 140 can be, for example, a tablet computer, a desktop computer, or laptop computer, a cellular enabled laptop (e.g., comprising a broadband adapter), a handheld computing device, a mobile phone, a telephone, a smartphone, a tablet computer, a wearable device, a virtual reality (VR) device, a heads-up display (HUD) device, an IoT device, and the like.

In example embodiments, a customer premises equipment (CPE) 150 can provide access for the UE (e.g., UE $140_2$) to the one or more networks (e.g., communication network 110). The CPE 150 can comprise a broadband access modem (e.g., cable modem, DSL modem, Wi-MAX modem, satellite modem). The CPE 150 can also comprise a gateway device (also referred to as a residential gateway, home gateway, set top gateway) that processes video, voice packets, and data packets and serves as a broadband connectivity point for various devices (e.g., video set-top boxes, computers, mobile devices, telephones). The UE (e.g., UE $140_2$) can be connected to the CPE device via, for example, an Ethernet interface, or a wireless access point device (which can be embedded within the CPE device, or connected to the CPE device as a peripheral device), which can operate in accordance with the IEEE 802.11 family of standards.

For voice services, a computer (or computing device) connected to a communication network 110 that executes voice over IP (VoIP) software can allow for voice calls to be made via a computer application (i.e., a "softphone" such as that offered by Skype). The VoIP software can be provided by one or more servers 120. Additionally, the CPE 150 can be embedded with a VoIP adapter, through which a telephone 1403 can connect (e.g., via an RJ-11 phone jack) and make voice calls. Examples of such devices that support voice and data communications are referred to as a telephony modems, embedded multimedia terminal adapters (EMTAs), digital voice modems, voice data modems, voice and internet modems, and the like. In other embodiments, a VoIP adapter can be peripheral to the broadband modem, and the telephone can connect to that VoIP adapter (e.g., an adapter provided by Vonage, Ooma, etc.). In other embodiments, a VoIP adapter can be connected to a computer, for example, via its universal serial bus (USB) port (e.g. an adapter provided by magicJack).

Referring to FIG. 1, a UE $140_4$ can be a mobile device used to make and accept voice calls, including a cellular phone, as well as a tablet with a cellular adapter. The mobile device can be operative to make voice calls through the communication network 110 to other communication devices. Further details describing a mobile device are described below in FIG. 14 below.

The UE 140 can also be a POTS telephone $140_5$ connected to the communication network 110.

Figure 2:
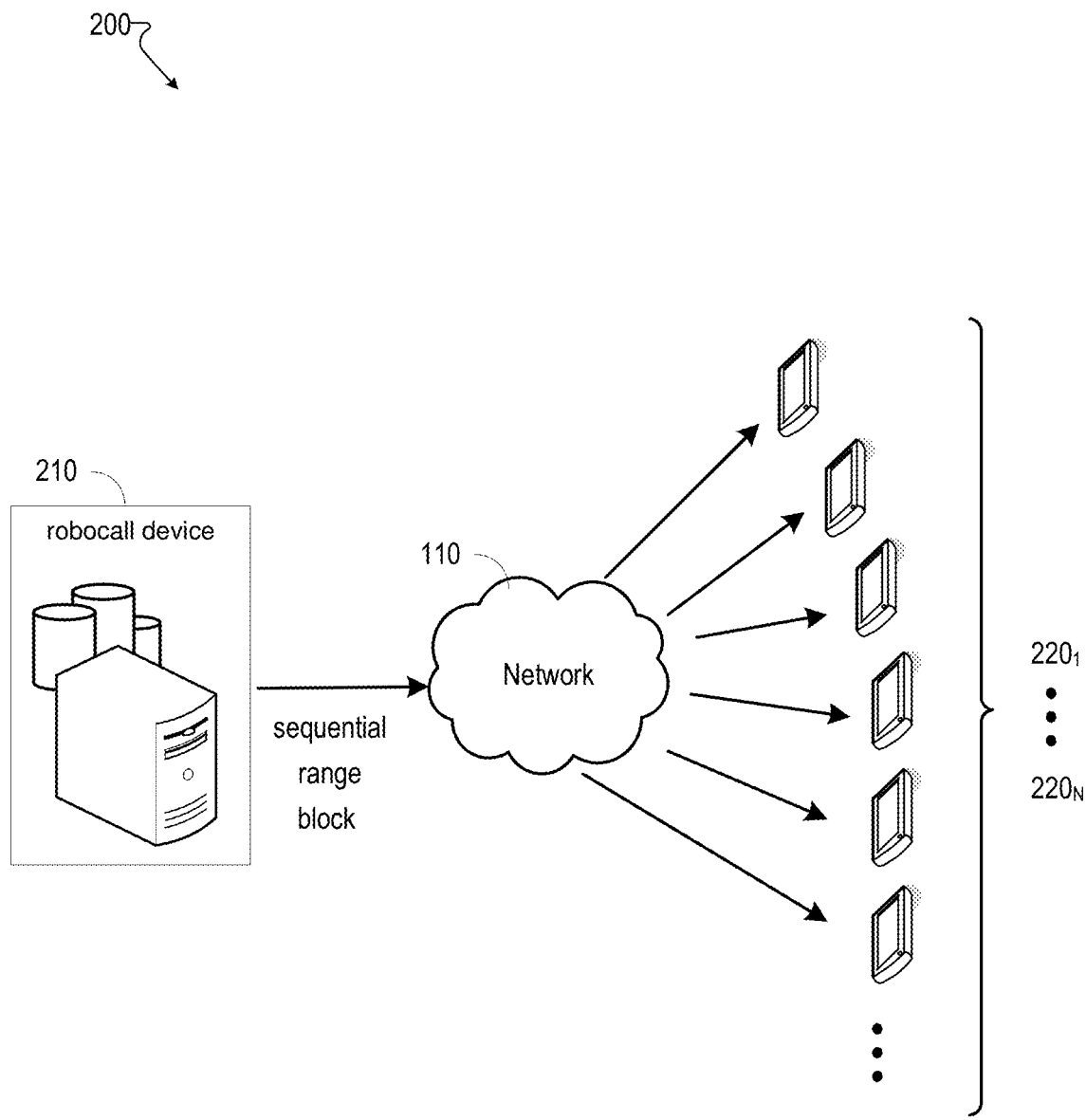
FIG. 2 is a diagram illustrating an example system and networking environment in which a robocall device calls multiple user equipment (UE).

FIG. 2 is a diagram that illustrates an example networking environment in which a typical robocall device 210 can be operable to initiate robocalls (e.g., robocalls). Typically, a robocall device 210 is used in business to consumer (B2C) applications, and can be one or more computers operable to run modules that, when executed, automatically makes voice calls, which can be made simultaneously or in rapid succession, to a plurality of call destinations. The robocall device 210 can be for example, a UE having a broadband connection and operable to make VoIP calls (e.g., UE $140_2$), and the modules can be locally stored or provided by one or more servers (e.g., servers 120). The robocall device 210 can make voice calls to called party UEs $220_{1-N}$, which can be one or more UEs 140 (e.g., a cellular phone, a VoIP phone, a POTS phone, etc.) that are operable to answer voice calls. After connection with a called party UE 220 (one of the plurality of called party UEs $220_{1-N}$) the robocall device 210 plays a pre-recorded message to either the called party identity, or a voicemail system if the called party identity does not answer. A large majority of robocalls originate through a VoIP network. Example vendors of robocall devices and predictive dialers are Voice2Phone, VoiceShot, Voicent, CallFire and Five9.

Intercepting and blocking unwanted robocalls can be a challenge, in large part because some of these calls are actual public service announcements, such as from the weather service, school system, public safety departments, etc. In other example use cases, large organizations, for example a large religious congregation, might use robocalls as an effective way to distribute pre-recorded messages. Thus, not every robocall is necessarily fraudulent, vexatious, or illegitimate.

Figure 3:
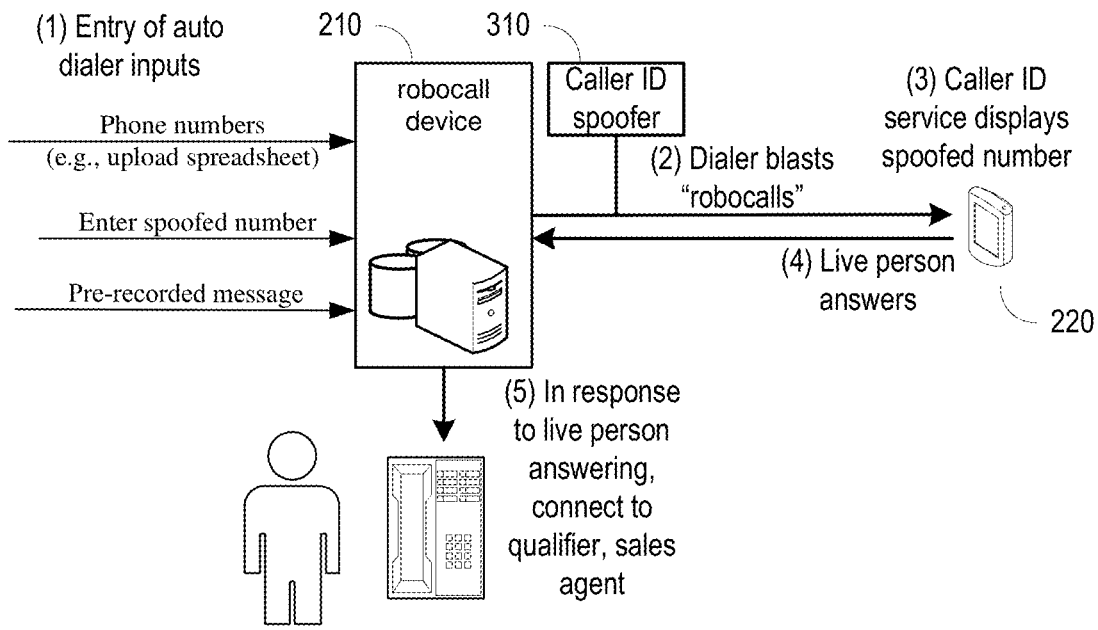
FIG. 3 is a diagram illustrating transactions between an example robocall device and a called party UEs.

In FIG. 3, a typical robocall device 210 operated by telemarketing identities, can at transaction (1) receive robocall device inputs. A robocall device input can comprise a plurality of target phone numbers corresponding to called party UEs (e.g., UEs $220_{1-N}$). The phone numbers might have been collected from called party identities, who might have provided their phone numbers in response to surveys, purchases, etc. A typical robocall device 210 allows input of phone numbers manually, as well by uploading a spreadsheet, or some other type of file, having the phone numbers. A robocall device input can also comprise a pre-recorded message (e.g., an audio file) which can be input by uploading or otherwise transferring the file to the robocall device 210. The pre-recorded message is played by the robocall device 210 when the robocall is answered by the called party UE 220 (or its answering service).

At transaction (2) of FIG. 3, the robocall device 210 can make a multitude of voice calls directed at called party UEs $220_{1-N}$. For illustrative purposes, only one called party UE 220 is shown. The robocall device 210, with its own spoofing module, or through a caller ID spoofing system 310 provided by another server, can be operable to transmit a "spoofed" number with the call that replaces the originating number of the robocall device. The spoofed number would show up on a caller ID display. Thus, each call would have associated with it the spoofed caller ID number that was entered at transaction (1). The result is that a number that the marketing identity wants to appear on a called party UE 220's caller ID display, instead of the originating number of the robocall (e.g., number of the calling party), and be entered. The likelihood that a robocall is vexatious, malicious, or fraudulent is extremely high when the calling party is spoofing its number. Many telemarketers (and in some instances, fraudulent companies) are now taking advantage of VoIP, SIP (session-initiated protocol), and network redirection services to make calls using fraudulently obtained (or obtained without authorization) phone numbers to use as a spoofed caller ID number. These obtained numbers might be legitimate numbers (e.g., actual phone numbers) belonging to a third-party identity. The robocall device 210 can thus mask robocalls as a legitimate call by spoofing the originating number, such that the robocall appears to a call blocking system, caller ID devices, as well as called party identities' devices (e.g., called party UE 220), as coming from the legitimate third-party identity. This tactic has the purpose of encouraging the called party to answer the call as it appears to be from a legitimate caller, instead of a telemarketer or fraudulent caller. It masks the calling party's true phone number to prevent tagging, blocking, or other activities that could reduce the robocalling device's opportunity to connect the call with the called party. Spoofing a call and using another third party's number (e.g., "spoofed victim") though, also can have the consequence of potentially redirecting negative responses back from the called party to a third party whose number was spoofed ("e.g., spoofed victim"), instead of complaints being directed to the actual calling party that is associated with the robocalling device (e.g., robocall device 210).

In an example case, a robocall device 210 might direct a call to a called party identity (e.g., "Victim #1). A robocall device 210 changes the caller ID associated with the call to a phone number not is not the actual number of the robocall device 210 (e.g., 770-555-0002), which is the phone number of the spoofed party (e.g., "Victim #2") in the expectation that Victim #1 will be more likely to answer since the caller ID number provided, that of Victim #2, appears to be a valid call and not a robocall. If the phone call is answered by Victim #1, and the content perceived as either vexatious or fraudulent, Victim #1 may report the call, or call back using the identified caller ID number, which would connect Victim #1 with Victim #2, as opposed to the robocaller. Victim #2 might be unaware that the robocall device utilized his or her # on the caller ID. In some instances, there have been calls in which the caller ID number is actually the same as the Victim's own phone number. Additionally, a caller ID spoofing system 310 can randomize the caller ID numbers so that even if one number can be blocked or reported by a victim, another spoofed number is obtained.

The calls that are made by the robocall device can be directed to phone numbers input into the robocall device 210 at transaction (1), as well as numbers selected by a predictive dialer, which can include numbers in a sequence (dialing numbers in sequential order), a block, or a range. Certain blocks of phone numbers are meant for certain businesses (for example, a block of numbers can be reserved for hospitals), and as such, numbers in particular blocks might be targeted by robocall devices. Numbers in a range are like numbers that are sequentially dialed, but are certain ranges of numbers within a sequence. Robocall devices can sometimes use ranges of numbers to avoid sequence dialing detecting algorithms that attempt to block robocalls (e.g., calling 0000 to 0500 might trigger an alert, but selecting a range of numbers within that sequence might avoid detection). Another characteristic of robocalls might be that the calls were dialed simultaneously, or in rapid succession with a short timeframe between each call (e.g., no pauses, or no significant pauses between calls).

At transaction (3), when a called party UE 220 is dialed, a caller ID service might display the number to the called party identity via the called party UE 220's GUI. If a robocall contained a spoofed number, the spoofed number might appear on the caller ID service (or caller ID device).

A typical robocall device 210 can be further operative to, in response to a called party identity answering a robocall, connect the called party UE 220 with a qualifier, wherein the qualifier might be an interactive voice response system (IVR) that prompts the called party identity to select or enter information. If certain information entered by the called party to the qualifier indicates that the called party identity's profile matches a profile of the marketing identity's target audience, the robocall device 210 can be operative to connect the called party UE 220 with a sales agent.

Figure 4:
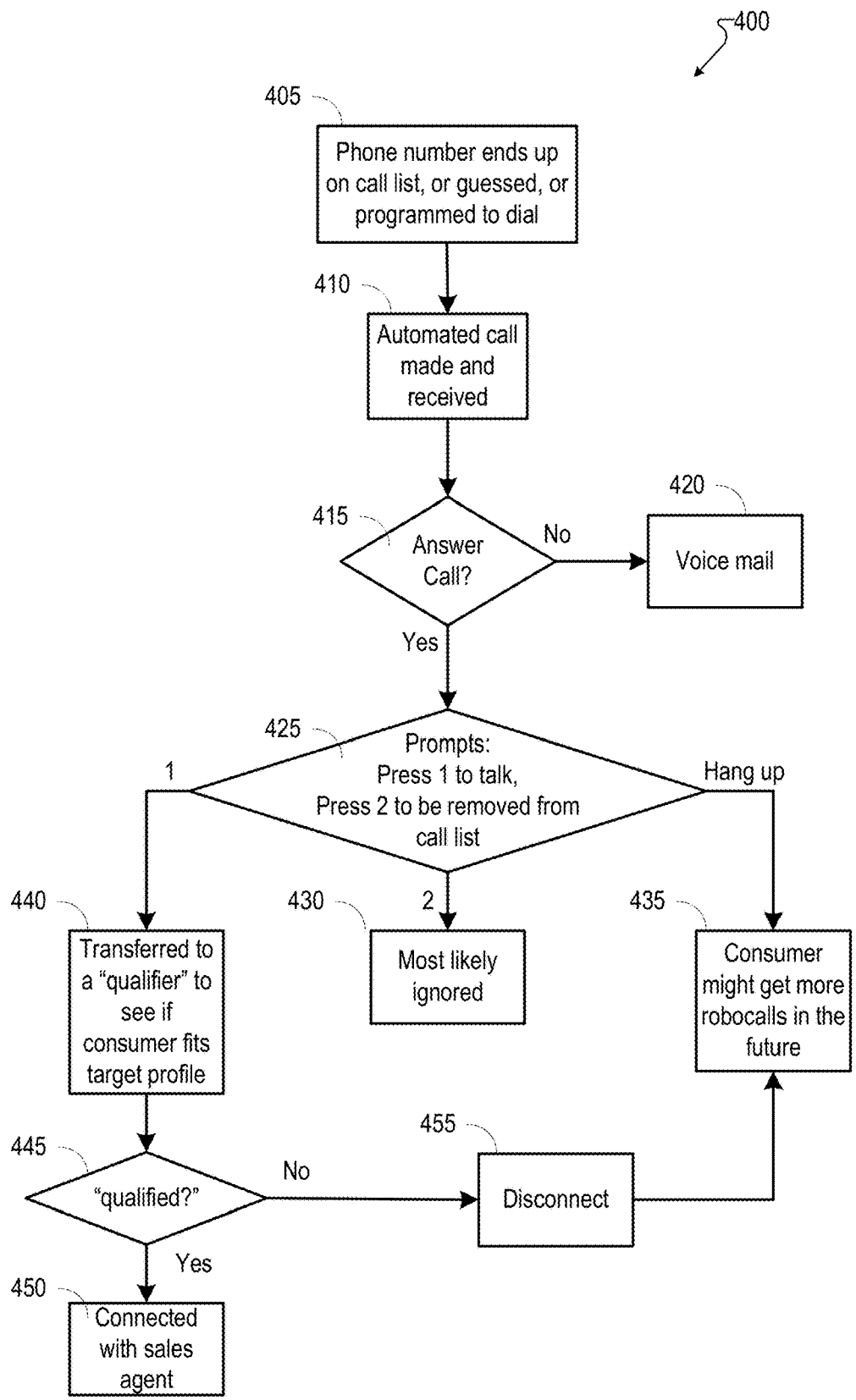
FIG. 4 is a flow chart illustrating an example of a called party's typical experience interacting with a robocall device.

FIG. 4 illustrates a typical response and experience of a user identity to a robocall. At step 405, the called party identity might have responded to a survey, signed up for an event, filled out an on-line application, or gave approval for a service or application to access his or her contact information, wherein the contact information comprises the called party identity's phone number. The called party identity's phone number might eventually wind up on a marketing entity's phone list.

At step 410, the called party identity might receive a phone call (e.g., an incoming call) on his or her phone (e.g., called party UE 220). If the phone is operable to display caller ID information, the calling party's number and name might show up on the caller ID display. However, this number and information might be a spoofed number and spoofed name. The number might have, for example, an area code that is the same as the area code of the called party identity's phone number, such that the called party identity might believe that the calling party is a local identity, such as a nearby friend or neighbor, thereby increasing the probability that the called party identity will answer the robocall.

At step 415, the called party identity can decide whether to answer the call. In response to the user not taking the call, at step 420 the call might be directed to the called party identity's voice mail, in which case the robocall device 210 plays the prerecorded message related to the subject matter of the sales call.

At step 425, if the called party identity answers the call, the robocall device 210 plays a prerecorded message briefly describing the goods or services being sold, and then prompts the called party identity to either push a button to speak to a representative or push a button to be removed from the marketer's phone list.

At step 430, in response to a called party identity's selection to be removed from the telemarketer's phone list, the called party identity's selection will most likely be ignored. If the called party entity at step 435 decides to hang up (e.g., end the call), the called party might still get more robocalls in the future. If the called party identity responds by indicating a desire to speak with a representative, the robocall device 210 might at step 440 connect the user with a qualifier, which can prompt the called party identity to select or enter information. If certain information entered indicates that the called party identity's profile matches a profile of the marketing identity's target audience, the called party identity at step 450 is transferred to a sales agent. If the called party identity's profile does not match, then at step 455 the robocall device 210 can inform the called party identity that his or her profile does not qualify them for the offer, and then disconnect. After disconnection, as was the case at step 435, the called party identity might still get another robocall in the future. As such, with robocalls, the experience of a called party identity can range from being annoyed, to being angry and frustrated.

Figure 5:
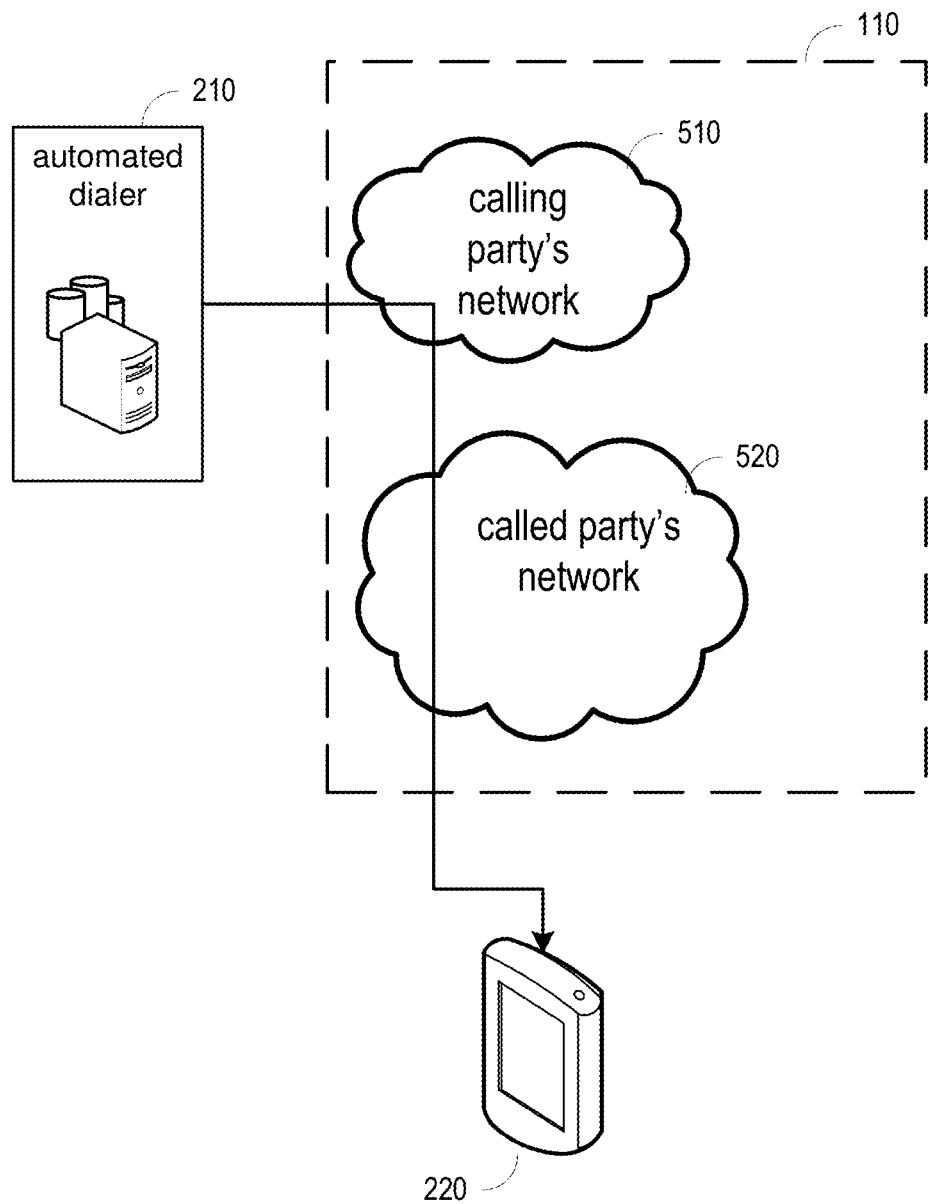
FIG. 5 is a diagram that illustrates a system in which a robocall device is connected to a called party UE via a calling party's network and a called party's network.

Phone numbers are serviced, or "owned," by one or more phone networks. As an example, as shown in FIG. 5, a calling party device, which can be robocall device 210, might be serviced by, as an example Google Voice services, and has a subscriber phone number associated (e.g., registered) with Google Voice services, and when robocall device 210 make voice calls, it initiates these calls through its originating network (e.g., calling party's network 510), Google Voice services. The call can be routed and connected through, for example, another network (e.g., called party's network 520), which may be, for example, AT&T's network. Thus, in this example, communication network 110 can comprise the calling party's network 510 and the called party's network 520). There is also the possibility that calls are serviced within the same network (e.g., if a calling party and called party are both serviced by AT&T's network), in which case the calling party and called party are serviced by the same network. Additionally, other intermediary networks can be included through which a call is routed. These phone networks implement the actual connectivity to the end user device by one or more technologies (e.g., circuit, VoIP, and cellular).

Figure 6:
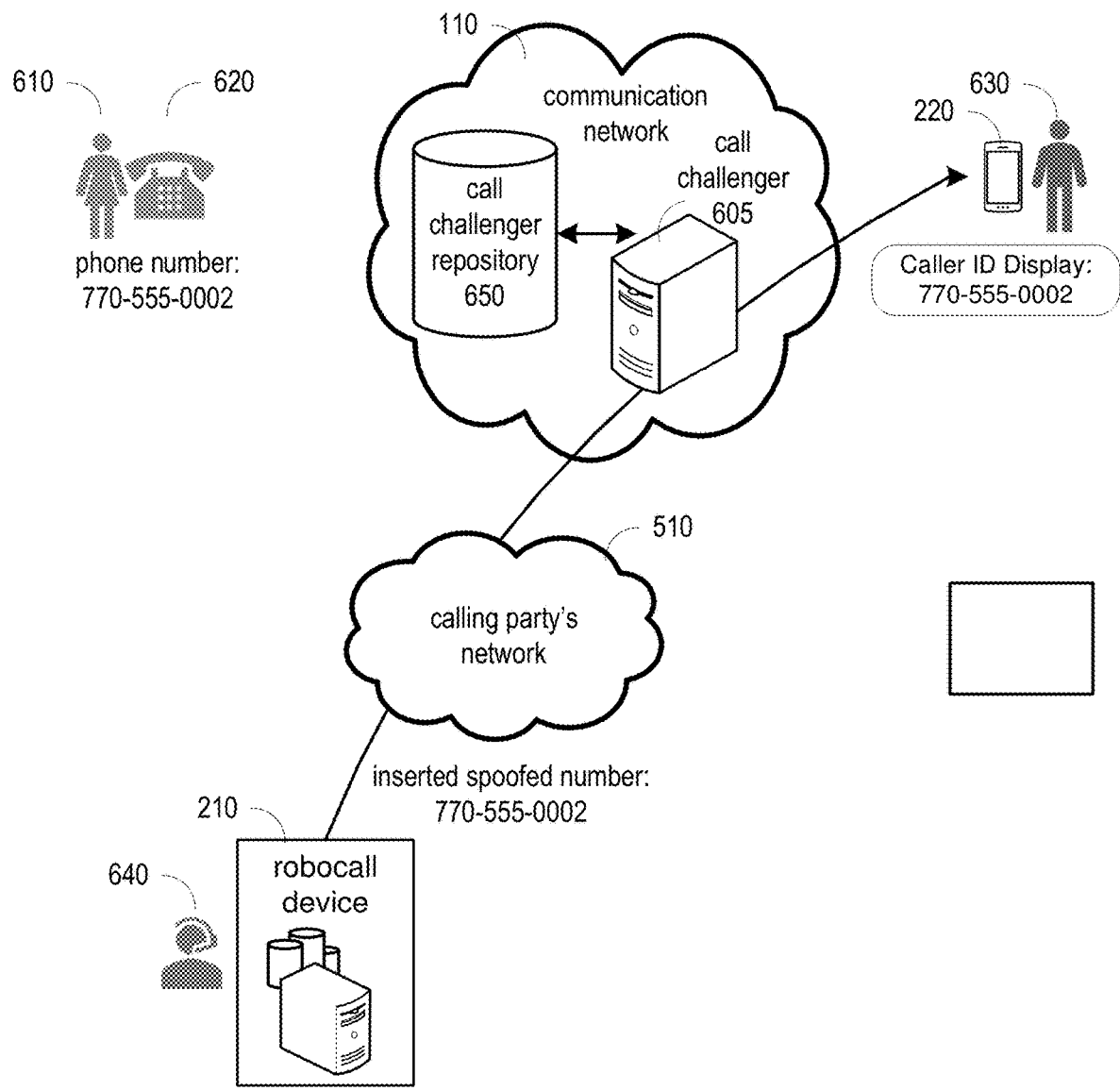
FIG. 6 is a diagram that illustrates an example embodiment of a call challenger device that challenges a call directed to a called party UE, in accordance with various aspects and embodiments of the subject disclosure.

FIG. 6 illustrates an example of a call challenger (e.g., call challenger 605) that can comprise one or more computing devices, each of which can comprise one or more processors and one or more memories that can store executable instructions (e.g., comprised of one or more software modules) that, when executed by the one or more processors, facilitate performance of operations in accordance with the present application as described herein. In example embodiments, the example call challenger 605 can be implemented as a network device, which can comprise one or more servers, one or more data stores, or can even be implemented within a communications switch. The call challenger 605 can comprise, for example, a network device, such as a switch, a server (e.g., device like server 120), a computer, etc. residing in the communication network 110, which can comprise called party's network 520. The example call challenger 605 can intercept calls in response to a called party identity opting-in to the call challenge service, challenge a calling device to present a valid response, and facilitating preventing the call from being connected if the response falls below a match score threshold.

Referring to FIG. 6, a calling party identity 610 might possess a calling party UE 620 (e.g., which can comprise the same type of device as UE $140_{1-N}$) having associated with it, a phone number 770-555-0002. Normally, if this calling party identity 610 calls a called party UE 220 using the calling party UE 620, the called party UE 220's caller ID display (or some other caller ID display, for example, a peripheral caller ID device displaying the caller ID) would show the calling number as 770-555-0002. In a spoofed call scenario, a telemarketing entity 640 (or, in some cases, a fraudulent identity) directs a robocall to called party UE 220 (thus, the called party identity 630 would be "Victim #1" of the robocall). The telemarketing entity 640 might be operating a robocalling device (e.g., robocall device 210), or some other communication device, capable of making a spoofed call (e.g., inserting a spoofed number that would be displayed by a caller ID display). It might obtain the phone number of the calling party identity 610 ("Victim #2")— 770-555-0002 and use it to spoof a call made to UE 220. In this scenario, when the robocall is made, and a caller ID display associated with the called party UE 220 displays the number of the caller, it would display the spoofed number— 770-555-0002—the number belonging to a Victim #2.

In example embodiments, a telephone or mobile device owner can opt-in to a call challenge service, which can employ the use of call challenger 605. In example embodiments, the call challenger 605 can facilitate presentation of a web-page, or some other application interface, in which a user identity can input a selection to opt-in to the call challenge service (see, e.g., GUI show in FIG. 8). The selection can be stored as a data element in a database associated with the call challenger 605 (e.g., call challenger repository 650). During the opt-in process, the device owner can also be prompted to provide a keyword, which can be used to challenge callers directing calls at the mobile device or telephone of the owner. The keyword can be a private or semi-private word or phrase that the device owner creates, for example by typing the keyword into a GUI (e.g., GUI of FIG. 8), or by inputting the keyword orally, or audibly (e.g., by having called party identity 630's voice with the keyword recorded). A keyword can comprise anything (e.g., alphanumeric, special characters, etc.), and can even comprise multiple keywords (e.g., a keyphrase). For example, the device owner might use his or her name as a keyword, and type or speak the device owner's name (e.g., device owner speaks the name "Sheldon"), much like creating a voicemail message. In example embodiments, if the owner of the telephonic device orally records the keyword, and it is received as an input by the call challenger 605, a voice-to-text converter of the call challenger can convert the audio input to text, and the spelling of the text can be read back to the owner for confirmation that the text is correct. Specifically, in the example wherein the name "Sheldon" was input as the keyword, the call challenger 605 can facilitate generation of sounds, resulting in the keyword being read back over the phone, for example letter-by-letter, as "S H E L D O N" to seek confirmation before committing those letters to storage (e.g., storing it into the call challenger repository 650).

Still on FIG. 6, once keywords are retained (e.g., in call challenger repository 650), and an incoming call directed to called party UE 220 is routed to the call challenger 605, the call challenger 605 first examines (or inspects) the call and determines if the owner of the number associated with the called device has opted-in for the call challenge functionality. In example embodiments, when an incoming call is routed through the call challenger 605, the call challenger 605 can inspect data associated with the call that indicates the destination of the call (e.g., the phone number of the destination device). The call challenger 605 can access the call challenger repository 650 to determine whether the phone number of the call destination matches a phone number of a device owner that has opted-in to the call challenge service. As an example, if "Sheldon" from our example above is the called party identity 630 with phone number 770-522-0002 and Sheldon opted-in to the call challenge service, and the call destination data indicates the destination number as 770-555-0002 matches an opt-in entry in the repository having 770-522-0002, then, in response to this positive determination, the call challenger 605 can intercept the call (e.g., prevent it from connecting to the called party UE 220), and challenge the incoming caller by prompting the caller to audibly present a keyword. In example embodiments, the calling party can be prompted with a challenge, or challenge question. For example, the prompt can instruct the calling party to speak the keyword that is the name of the called party (e.g., "Please speak the name of the party you are attempting to reach"). An alternative embodiment would be to permit the incoming caller to type in a numeric code that has been pre-recorded by the device owner, although entry of a code into a phone, as opposed to speaking the keyword, can be more cumbersome.

The caller can speak the keyword (or keyphrase), and the call challenger 605 can receive the spoken keyword as an audio file, and then convert the recorded audio into text. The call challenger 605 can then compare that text to the keyword text provided by the called party identity, looking for a match. The match does not have to be exact and can instead be a statistical score. For instance, if the caller says Sheldin and the converted text is Sheldin, instead of Sheldon, it is close but not exact. Depending on acceptance criteria, if the match is sufficiently close (e.g., reaches a threshold match score), the call will not be prevented by the call challenger 605 from being connected to the called device.

Still on FIG. 6, if acceptance criteria are sufficiently tight on match scoring, the call challenger 605 can also prompt the calling party to "try again" to respond with the keyword again, which may result in a better match. People who speak languages different than the called party or having strong dialects, may have abnormally low match scores. This is something that can also be learned over time. In example embodiments, if the voice to text subsystem detects certain voice characteristics, then it may dynamically modify the required matching score . . . not because of a potential mismatch with the called party, but instead a potential mismatch with the stored text. It is also possible that some stored text is more prone to pronunciation errors than other stored text and this can also be learned by a machine learning subsystem of the call challenger 605 to dynamically learn whether to tighten acceptance criteria. In example embodiments, the call challenger 605 can also determine and update the stored keyword text with known variations of a particular word, or even variations supplied by the called party that opted-in. For example, if a particular keyword is fortnite, the call challenger 605 can also store variations of the word, such as fotnight, fortnyte, foughtnight, fartnite, etc., such that an audible response that results in a translation into a variation of the keyword might still produce a tight match.

In example embodiments, if an incoming call is rejected by the call challenger 605 (e.g., low match score, if a certain amount of time has elapsed without a response, etc.), the call challenger 605 can facilitate the playing of a message to the caller informing the caller of the reason for the rejection, and can also indicate to the caller that he or she should attempt to reach the called party by text message, or other means.

Still referring to FIG. 6, feedback at the end of the call can be used to identify unwanted calls that were not blocked, or calls that were blocked that the called party desires not to be blocked. The called party could receive a report, which can be a periodic report, that comprises rejected calls, showing the calling number (or name) and perhaps rejection criteria. In example embodiments, device owner can change, or add, keywords and variations of keywords to improve the odds that desired callers successfully get through to them. Or, in example embodiments, as a result of the called party's feedback, keywords can be updated to comprise variations of a word. For example, for a call that was rejected because the audible response was translated to "sheldin" instead of "sheldon," an indication that the call should have been let through by the call challenger 605 can result in an update of that keyword to include the text "sheldin" as acceptable. This is an example of how the call challenger 605 dynamically learns variations in the text, based on input from the called party.

Figure 7:
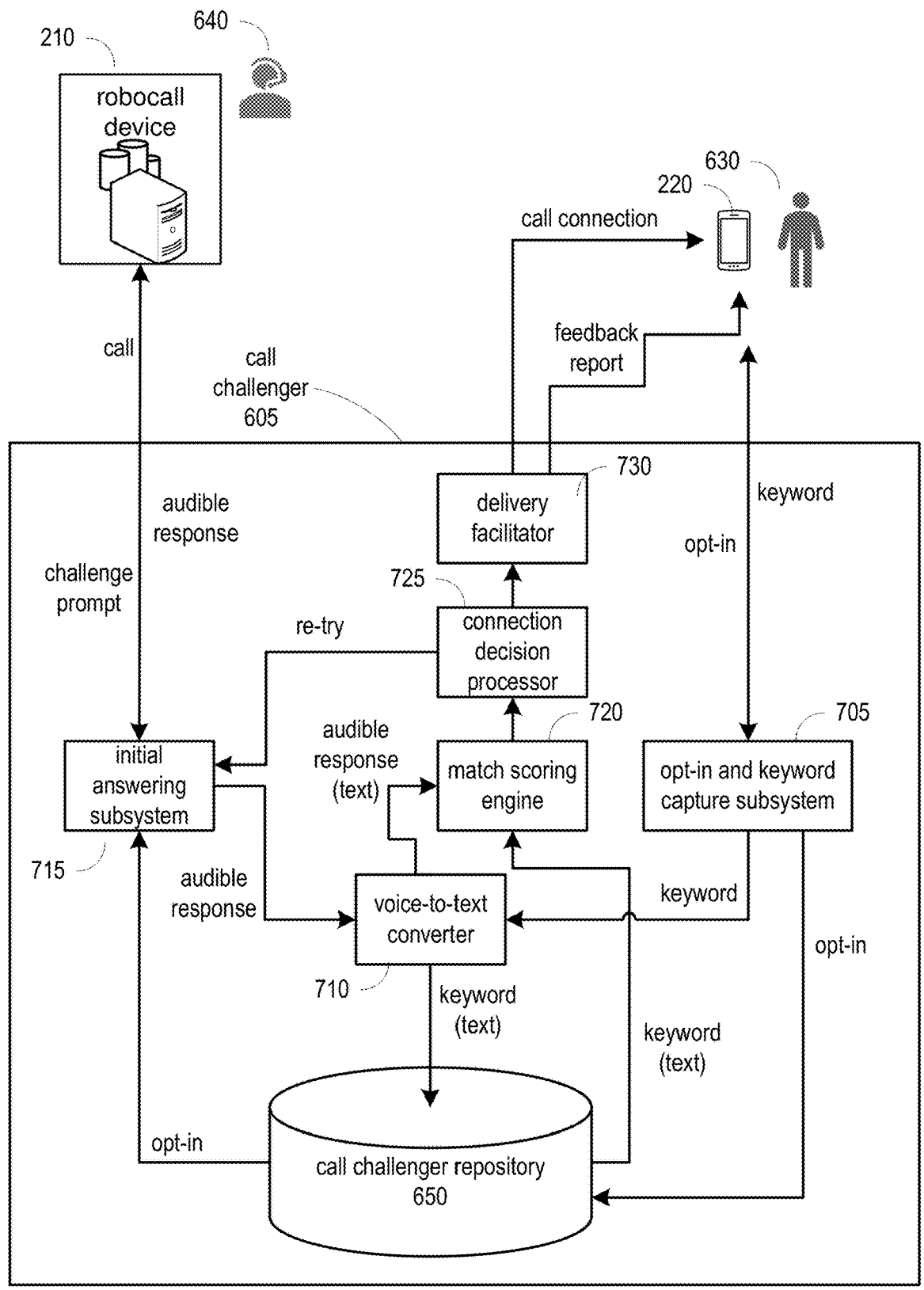
FIG. 7 is a diagram that illustrates example components of an example embodiments of a call challenger (e.g., device or system), in accordance with various aspects and embodiments of the subject disclosure.

FIG. 7 illustrates an example embodiment of call challenger 605. The components (e.g., hardware, software, or a combination thereof) of the example call challenger 605 can comprise an opt-in and keyword capture subsystem 705, a voice-to-text converter 710, call challenger repository 650, initial answering subsystem 715, match scoring engine 720, connection decision processor 725, and delivery facilitator 730.

Referring to FIG. 7, in an example scenario, a device owner (e.g., called party identity 630) possesses a telephone or mobile device (e.g., called party UE 220) having associated with called party UE 220 the phone number 770-555-0002. If the called party identity 630 wishes to opt-in to the call challenge service, the called party identity 630 can access a GUI (e.g., webport, webpage, dialogue, etc.) that allows the called party identity to make an opt-in selection to the call challenge service, and also input and submit a keyword (see, e.g., FIG. 8).

In example embodiments, a telephone or mobile device owner can opt-in to a call challenge service, which can employ the use of call challenger 605. In example embodiments, the opt-in and keyword capture subsystem 705 of call challenger 605 can facilitate presentation of a web-page, or some other application interface, in which a user identity can input a selection to opt-in to the call challenge service (see, e.g., GUI shown in FIG. 8). The opt-in and keyword capture subsystem 705 can function as a web server, for example, serving up a webpage that can present the called party 630 with instructions, and can receive inputs of an opt-in selection, and receive entry of a keyword that can be used to challenge callers directing calls at the called party UE 220. The webpage can be displayed on a browser executing on a computer, UE (e.g., UE 140), or called party UE 220. The keyword can be input, for example by typing the keyword into a field displayed by the webpage, or by speaking the keyword (e.g., by having called party identity 630's voice recorded with the keyword recorded) into a microphone of a computer, or by speaking the keyword into the audible input device of a cellphone. For example, the device owner might type or speak the device owner's name (e.g., device owner speaks the name "Sheldon"), much like creating a voicemail message.

If the device owner speaks the keyword, the keyword in the voice input format can be received by the opt-in and keyword capture subsystem 705 and forwarded to the voice-to-text converter 710. The voice-to-text converter 710 can convert the audio input to text, and send the text back to the opt-in and keyword capture subsystem 705, which can then read back the spelling of the text to the owner for confirmation that the text is correct. Specifically, in the example wherein the name "Sheldon" was input as the keyword, it can be read back over the phone (or computer speaker, headphone, etc.) letter by letter as "S H E L D O N" and seek confirmation before committing those letters to the challenge subsystem (e.g., storing it into the call challenger repository 650).

Still referring to FIG. 7, the opt-in and keyword capture subsystem 705 can take the received selection to opt-in and the keyword (in text format) and store them as data in the call challenger repository 650. The data can comprise data elements that indicate the identity of the called party (e.g., user name, customer number, etc.), the number associated with the device of the called party (e.g., 770-555-0002), the desire to opt-in, and the keyword. As mentioned above, variations of the keyword can also be stored.

When an incoming call is routed to the call challenger 605, the initial answering subsystem 715 of the call challenger 605 first examines (or inspects) the call and determines if the owner of the number associated with the called device has opted-in for the call challenge functionality. The initial answering subsystem 715 can inspect data associated with the call that indicates the destination of the call (e.g., the phone number of the destination device). The call challenger 605 can access the call challenger repository 650 to determine whether the phone number of the call destination matches a phone number of a device owner that has opted-in to the call challenge service. As an example, if "Sheldon" from our example above is the called party identity 630 with phone number 770-522-0002 and Sheldon opted-in to the call challenge service, and the call destination data indicates the destination number 770-555-0002 matches an entry in the repository having 770-522-0002, then, in response to this positive determination, the call challenger 605 can challenge the incoming caller by prompting the caller to orally present a keyword. In example embodiments, the calling party can be prompted to speak the keyword of the called party.

The caller can speak the keyword (or keyphrase). The initial answering subsystem 715 can receive the spoken keyword as an audio file, and then send the audio file to the voice-to-text converter 710 to convert the recorded audio into text. The text can be forwarded to the match scoring engine 720. The match scoring engine 720 can then compare that text to the text provided by the called party identity (e.g., retrieve the keyword text from the call challenger repository 650), looking for a match. As mentioned above, if a match is sufficiently close (e.g., reaches a threshold match score), the connection decision processor 725 might not prevent the call from being connected to the called party UE 220. The delivery facilitator 730 can facilitate the connection of the call between the caller and the calling party. On the other hand, if no response is provided, which would likely be the case with a robocall device, the call can be prevented from reaching the called party (e.g., the can be terminated; the call can also be directed by the delivery facilitator 730 to a voice mail system, for example, one that is not the called party identity's normal voice mail system). The connection decision processor 725 can also direct the initial answering subsystem 715 to prompt the caller to "try again" so that the caller can present the keyword again, which might result in a better match. If an incoming call is rejected by the call challenger 605, the initial answering subsystem 715 can facilitate the playing of a message to the caller informing the caller of the reason for the rejection, and can also indicate to the caller that he or she should attempt to reach the called party by text message, or other means.

Still on FIG. 7, the connection decision processor 725 can also provide feedback after calls. The feedback can be in the form of, for example, a report, stored in the call challenger repository 650. The feedback report can be retrieved from the call challenger repository 650 and delivered to, for example, a web-accessible location. The feedback report can be displayed in a GUI (e.g., the GUI of FIG. 9) and can comprise entries for each call that was blocked and can also comprise entries for each call that was permitted to reach the called party. The feedback report can show the calling number, calling party name, and perhaps rejection criteria. In example embodiments, from the GUI displaying the feedback report, the device owner can change, or add, keywords and variations of keywords to improve the odds that desired callers successfully get through to them. Or, in example embodiments, as a result of the called party's feedback, keywords can be updated with variations of a word that should have been accepted but was determined not to match. Additionally, if the feedback report entry indicated that an unwanted call was connected, the device owner can indicate that the converted text that resulted in the match should be removed as a match, thus preventing it from being used to positively match a response. If the feedback report indicated that the response was a match, the device owner can still add the caller to the block list, so that even should a correct response be given by the caller next time, calls from the caller can still be blocked.

FIG. 8 illustrates an example embodiment of an opt-in and keyword entry GUI 800. The opt-in and keyword entry GUI 800 can comprise a message prompting a device owner to sign up for the call blocking service, by, for example, checking a box. The opt-in and keyword entry GUI 800 can also provide an indication that the device owner can speak the keyword after, for example, pressing a button that looks like a microphone. After the keyword is received as an input, a voice-to-text converter (e.g., voice-to-text converter 710) of the call challenger 605 can convert the audio input to text, and the spelling of the text can be read back to the owner (e.g., letter-by-letter) for confirmation that the text is correct.

FIG. 9 illustrates an example of a feedback report GUI 900. The feedback report GUI 900 can comprise lines of entries that indicate the calling party, the keyword provided, the disposition of the call (e.g., allowed or blocked), and treatment of the next call. The feedback report GUI 900 can be used to identify unwanted calls that got through. For example, as shown in feedback report GUI 900, perhaps the called party identity did not want to receive a call from Vax Potor, even though Vax provide the correct response when prompted for the keyword ("sheldon"). In this instance, the user can select the "block" button associated with Vax Potor to indicate that the treatment for the next call from Vax would be to block the call. The feedback report GUI 900 might indicate a robocall that was blocked (e.g., from Campground Workers of America). If the called party identity decides that he or she would like to receive calls from this party in the future, the called party identity can indicate that the treatment of the next call from Campground Workers of America would be to allow the call. Feedback report GUI 900 might also indicate an entry related to a calling party that was blocked (e.g., Judy Jones), and provide the keyword with which the party responded (e.g., "showden" instead of "sheldon"). If the call challenger 605 did not already account for this variation (e.g., saved the variation with the keyword, or a match resulted in a high enough match score threshold), the called party identity can see that Judy Jones, who perhaps has a northern accent, responded to the call challenge with an audible response that was converted to "showden". Here, the called party can select an option that allows all future calls from Judy Jones to connect, add the keyword variation "showden" as acceptable, so that the next time Judy Jones or any other calling party responds with an audible that results in a converted text of "showden" the call will be allowed, or do both.

In each of the example operations described above, and below in FIGS. 10-12, steps, blocks, features, or aspects can be substituted or combined with other steps, blocks, features, or aspects, unless context warrants that such combinations or substitutions are not possible. Further, if a step, block, feature, or aspect is not described with respect to example operations, this does not mean that the feature, step, or aspect is incompatible or impossible with respect to those example operations. As such, the example operations of the present application described above and below are not necessarily limited to the steps, features, or aspects that are described with respect to those example operations.

Figure 10:
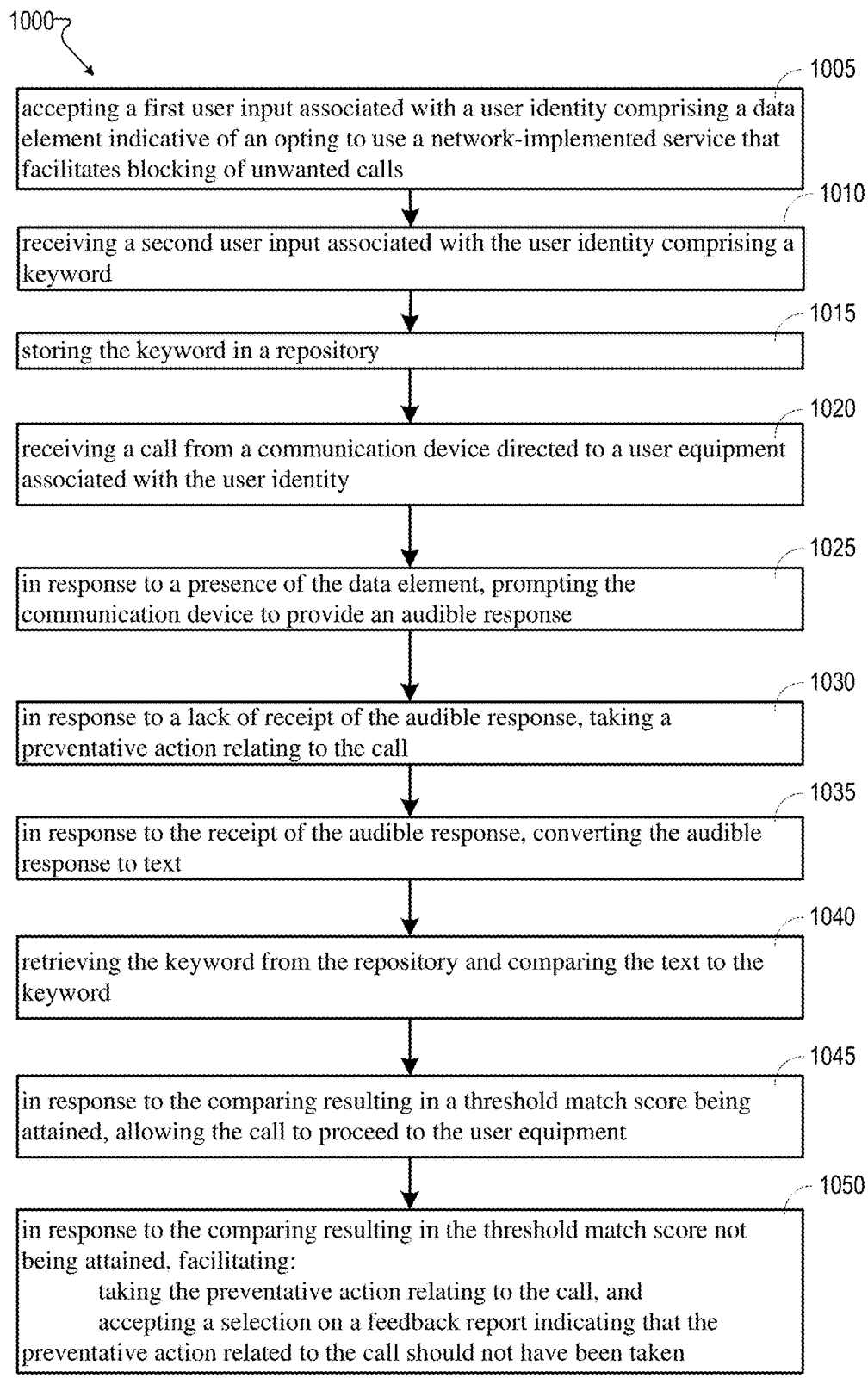
FIG. 10 illustrates a flow diagram of example operations that can be performed by a call challenger device, in accordance with various aspects and embodiments of the subject disclosure.

FIG. 10 illustrates example operations that can be performed by a call challenger (e.g., call challenger 605), in accordance with example embodiments of the present application. The call challenger can comprise a network device comprising a processor and machine-readable storage medium (e.g., memory) that stores executable instructions that, when executed by the processor, can facilitate performance of operations 1000.

The example operations 1000 can comprise, at step 1005, accepting a first user input associated with a user identity (e.g., called party identity 630) comprising a data element indicative of an opting to use a network-implemented service (e.g., call challenge service) that facilitates blocking of unwanted calls (whether robotic or other). The data element can be stored in a repository (e.g., call challenger repository 650).

At step 1010, the example operations 1000 can comprise receiving a second user input associated with the user identity comprising a keyword. The keyword can comprise alphanumeric characters entered via a user input device (e.g., in the example illustrative scenarios above, a keyword could be a name, such as "Sheldon"). The keyword can be received via an audible input, wherein the keyword can be converted from an audible format of the audible input to a text format.

The example operations 1000 at step 1015 can comprise storing the keyword in the repository. The first user input and the second use input can be entered via, for example, a graphical user interface (e.g., opt-in and keyword entry GUI 800).

The example operations 1000 can compromise, at step 1020, receiving a call from a communication device directed to a user equipment associated with the user identity. The call could be a robocall (e.g., from robocall device 210), or it could be a non-robocall.

At step 1025, the example operations 1000 can comprise, in response to a presence of the data element (e.g., determining that the user identity has opted-in to the call challenge service), prompting the communication device to provide an audible response (e.g., "please speak the name of the party you are trying to call", or "To complete your call, please speak the keyword.").

In response to a lack of receipt of the audible response (e.g., after a time has elapsed), the example operations 1000 can comprise, at step 1030, taking a preventative action relating to the call. The preventative action can be facilitating blocking the call. The preventative action can be directing the call to a call answering device, wherein the call answering device can store a message related to the call, and wherein the message can be accessible by the user equipment, or some other computing device.

The example operations 1000 can further comprise, in step 1035, in response to the receipt of the audible response, converting the audible response to text.

The example operations 1000 at step 1040 can further comprise retrieving the keyword from the repository and comparing the text to the keyword. The comparing the text to the keyword can also comprise comparing the text to a variation of the keyword (e.g., as illustrated by a scenario above, fortnight can be a variation of fortnite). The variation can be supplied by the user identity, or can be determined by the network device (e.g., determined based on known variations, such as night, nite, and knight).

In response to the comparing resulting in a threshold match score being attained, at step 1045, the example operations can further comprise allowing the call to proceed to the user equipment.

In response to the comparing resulting in the threshold match score not being attained, facilitating taking the preventative action relating to the call, and facilitating accepting a selection on a feedback report. The feedback report can be displayed in a web browser as a webpage (e.g., feedback report GUI 900), which can be accessible to the user identity via a web browser of the user equipment, or some other computing device. The selection can indicate that the preventative action related to the call should not have been taken. The example operations can further comprise updating the variation of the keyword to comprise the rejected text (e.g., as illustrated above, for the keyword "Sheldon" a response of "showden" might have been rejected).

Figure 11:
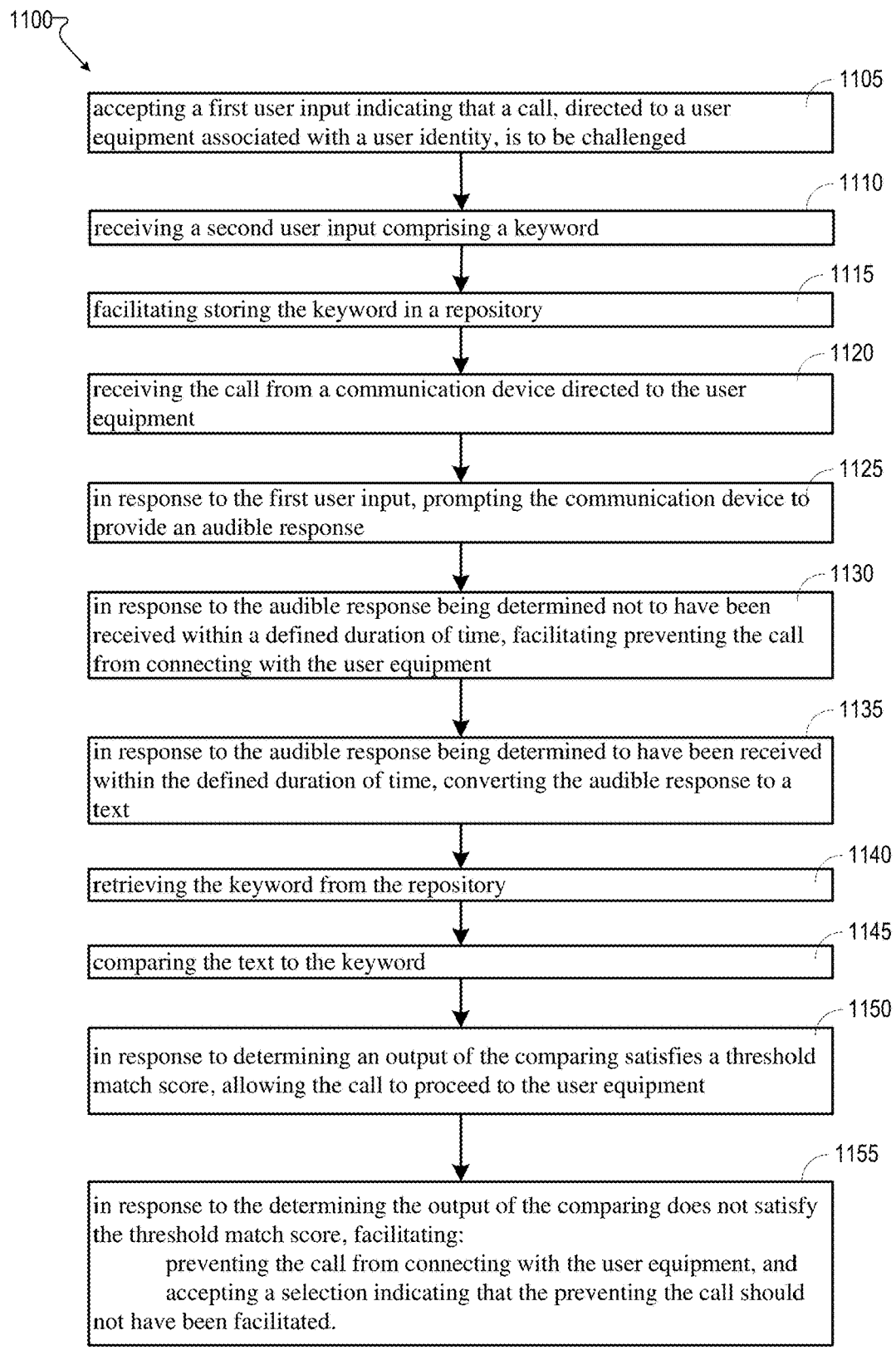
FIG. 11 illustrates a flow diagram of another example of operations that can be performed by a call challenger, in accordance with various aspects and embodiments of the subject disclosure.

FIG. 11 illustrates example operations that can be performed by a call challenger (e.g., call challenger 605), in accordance with example embodiments of the present application. The call challenger can comprise a network device comprising a processor and machine-readable storage medium (e.g., memory) that stores executable instructions that, when executed by the processor, can facilitate performance of operations 1100.

The example operations 1100 at step 1105 can comprise accepting a first user input indicating that a call, directed to a user equipment associated with a user identity, is to be challenged. The first user input can be stored in a repository (e.g., call challenger repository 650).

The example operations 1100 can further comprise, at step 1110, receiving a second user input comprising a keyword.

At step 1115, the example operations 1100 can further comprise facilitating storing the keyword in the repository.

The first user input and the second use input can be entered via, for example, a graphical user interface (e.g., opt-in and keyword entry GUI 800).

The example operations 1100 at step 1120 can further comprise receiving the call from a communication device directed to the user equipment. The call can comprise a robotic call and the communication device can comprise a robotic dialer device (e.g., robocall device 210). The call can also comprise a call from a phone operated by a person.

In response to the first user input (e.g., determination that the user identity has opted-in to the call challenge service), the example operations 1100 can further comprise, at step 1125, prompting the communication device to provide an audible response (e.g., "please speak the name of the party you are trying to call", or "To complete your call, please speak the keyword.").

In response to the audible response being determined not to have been received within a defined duration of time, the operations 1100 can at step 1130 comprise facilitating preventing the call from connecting with the user equipment (e.g., by blocking the call, directing the call to a call answering device that stores a message related to the call, and wherein the message is accessible by the user equipment, etc.).

In response to the audible response being determined to have been received within the defined duration of time, at step 1135, the example operations 1100 can comprise converting the audible response to a text.

The example operations 1100, at step 1140, can further comprise retrieving the keyword from the repository.

The example operations 1100 can further comprise, at step 1145, comparing the text to the keyword. The comparing the text to the keyword can also comprise comparing the text to a variation of the keyword.

At step 1150, the example operations 1100 can further comprise, in response to determining an output of the comparing satisfies a threshold match score, allowing the call to proceed to the user equipment.

The example operations 1100, at step 1155, can further comprise, in response to the determining the output of the comparing does not satisfy the threshold match score, facilitating preventing the call from connecting with the user equipment, and facilitating accepting a selection indicating that the preventing the call should not have been facilitated (e.g., FIG. 9). The operations can further comprise updating the variation of the keyword to comprise a rejected text (e.g., text that did not result in the threshold match score being satisfied).

The example operations 1100 can further comprise transmitting a feedback report indicating the details of calls directed to the user equipment (see, e.g., FIG. 9).

Figure 12:
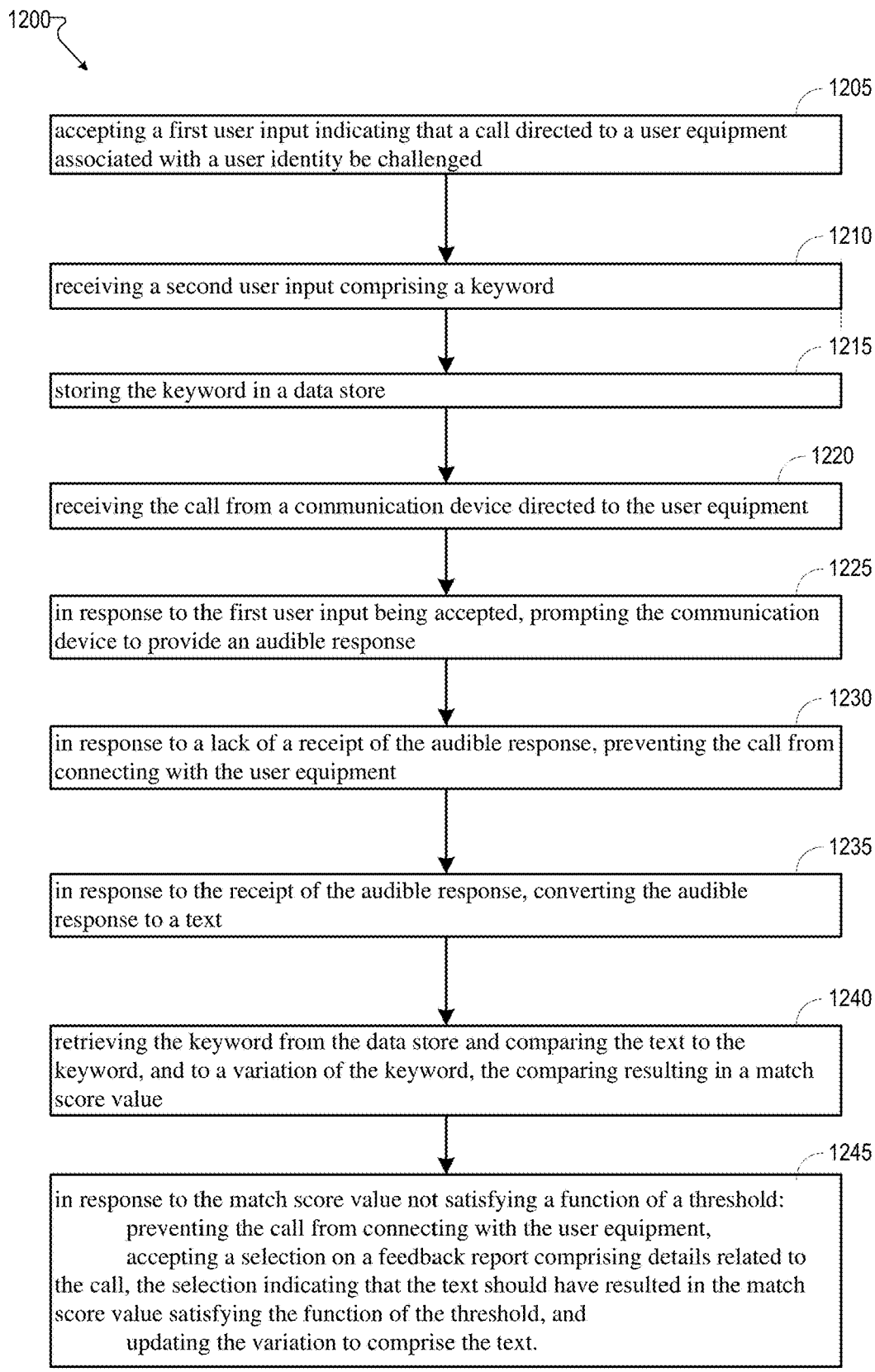
FIG. 12 illustrates a flow diagram of yet another example of operations that can be performed by a call challenger, in accordance with various aspects and embodiments of the subject disclosure.

Moving on to FIG. 12, FIG. 12 illustrates example operations that can be performed by a call challenger (e.g., call challenger 605), in accordance with example embodiments of the present application. The call challenger can comprise a network device comprising a processor and machine-readable storage medium (e.g., memory) that stores executable instructions that, when executed by the processor, can facilitate performance of operations 1200.

The example operations 1200 can, at step 1205, comprise accepting a first user input indicating that a call directed to a user equipment associated with a user identity be challenged. The first user input can be stored in a data store, for example, call challenger repository 650.

At step 1210, the operations can further comprise, receiving a second user input comprising a keyword. The keyword can comprise alphanumeric characters that were entered via a user input device. The keyword can be received via an audible input, wherein the keyword can be converted from an audible format into a text format.

The example operations 1200 can further comprise, at step 1215, storing the keyword in the data store. The first user input and the second use input can be entered via, for example, a graphical user interface (e.g., opt-in and keyword entry GUI 800).

The example operations 1200 at step 1220, can further comprise, receiving the call from a communication device directed to the user equipment. The call can comprise a robotic call and the communication device can comprise a robotic dialer device. Or, the call could also be a call from a phone operated by a person.

In response to the first user input being accepted (e.g., in response to a determination that the user identity has opted-in to the call challenge service), at step 1225, the operations 1200 can further comprise, prompting the communication device to provide an audible response (e.g., "please speak the name of the party you are trying to call", or "To complete your call, please speak the keyword.").

In response to a lack of a receipt of the audible response (e.g., lack of an audible response within a period, or after an amount of time has elapsed), the example operations 1200 can, at step 1230, further comprise preventing the call from connecting with the user equipment (e.g., by blocking the call, or by directing the call to another location).

In response to the receipt of the audible response, the example operations 1200 can further comprise, at step 1235, converting the audible response to a text.

The example operations 1200 can further comprise, at step 1240, retrieving the keyword from the data store and comparing the text to the keyword, and to a variation of the keyword, the comparing resulting in a match score value.

In response to the match score value not satisfying a function of a threshold, the example operations 1200 can further comprise, at step 1245, preventing the call from connecting with the user equipment, accepting a selection on a feedback report (see e.g., feedback report GUI 900) comprising details related to the call, the selection indicating that the text should have resulted in the match score value satisfying the function of the threshold, and updating the variation to comprise the text. The feedback report can comprise a log of calls destined for the user equipment.

Figure 13:
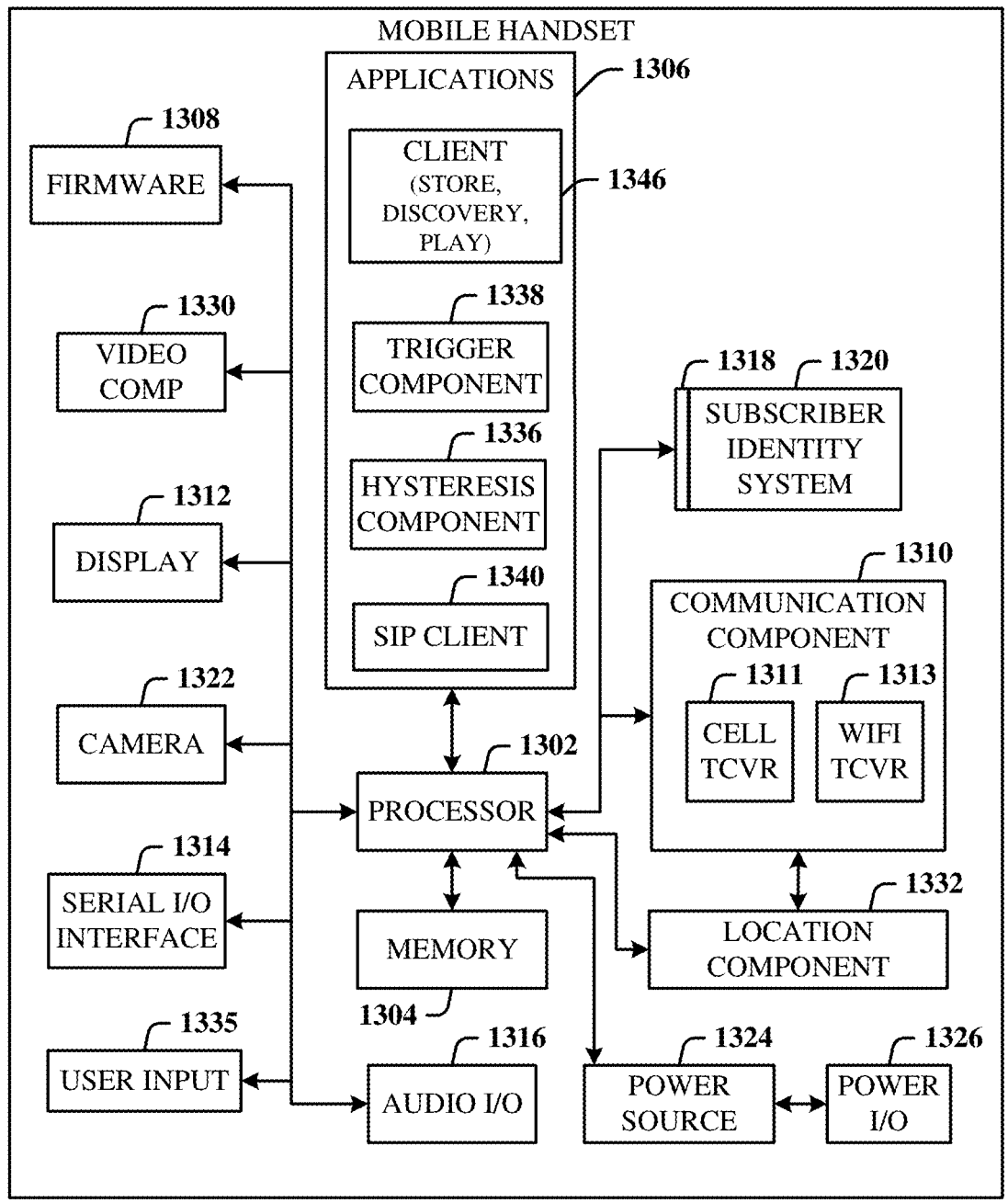
FIG. 13 illustrates a block diagram of an example mobile device that can be operable to execute processes, operations, and methods, in accordance with various aspects and embodiments of the subject disclosure.

Referring now to FIG. 13, illustrated is a schematic block diagram of an example end-user device such as a user equipment (e.g., UE 140, called party UE 220) that can be a mobile device capable of connecting to a network in accordance with some embodiments described herein. One or more of the components as illustrated in FIG. 13 can comprise the user equipment, and although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment in which the various embodiments can be implemented. While the description comprises a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and that can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The mobile handset 1300 comprises a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the mobile handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMAX) for corresponding signal communications. The mobile handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The mobile handset 1300 comprises a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the mobile handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The mobile handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the mobile handset 1300, and updated by downloading data and software.

The mobile handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the mobile handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The mobile handset 1300 also comprises a power source 1324 in the form of batteries and/or an AC power subsystem, which power source 1324 can interface to an external power system or charging equipment (not shown) by a power I/O component 1326.

The mobile handset 1300 can also include a video component 1330 for processing video content received and, for recording and transmitting video content. For example, the video component 1330 can facilitate the generation, editing and sharing of video quotes. A location tracking component 1332 facilitates geographically locating the mobile handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the mobile handset 1300 to support SIP protocols and register the subscriber with the SIP registrar server. The applications 1306 can also include a client 1342 that provides at least the capability of discovery, play and store of multimedia content, for example, music.

The mobile handset 1300, as indicated above related to the communications component 1310, comprises an indoor network radio transceiver 1313 (e.g., Wi-Fi transceiver). This function supports the indoor radio link, such as IEEE 802.11, for a dual-mode GSM handset. The mobile handset 1300 can accommodate at least satellite radio services through a handset that can combine wireless voice and digital radio chipsets into a single handheld device.

Figure 14:
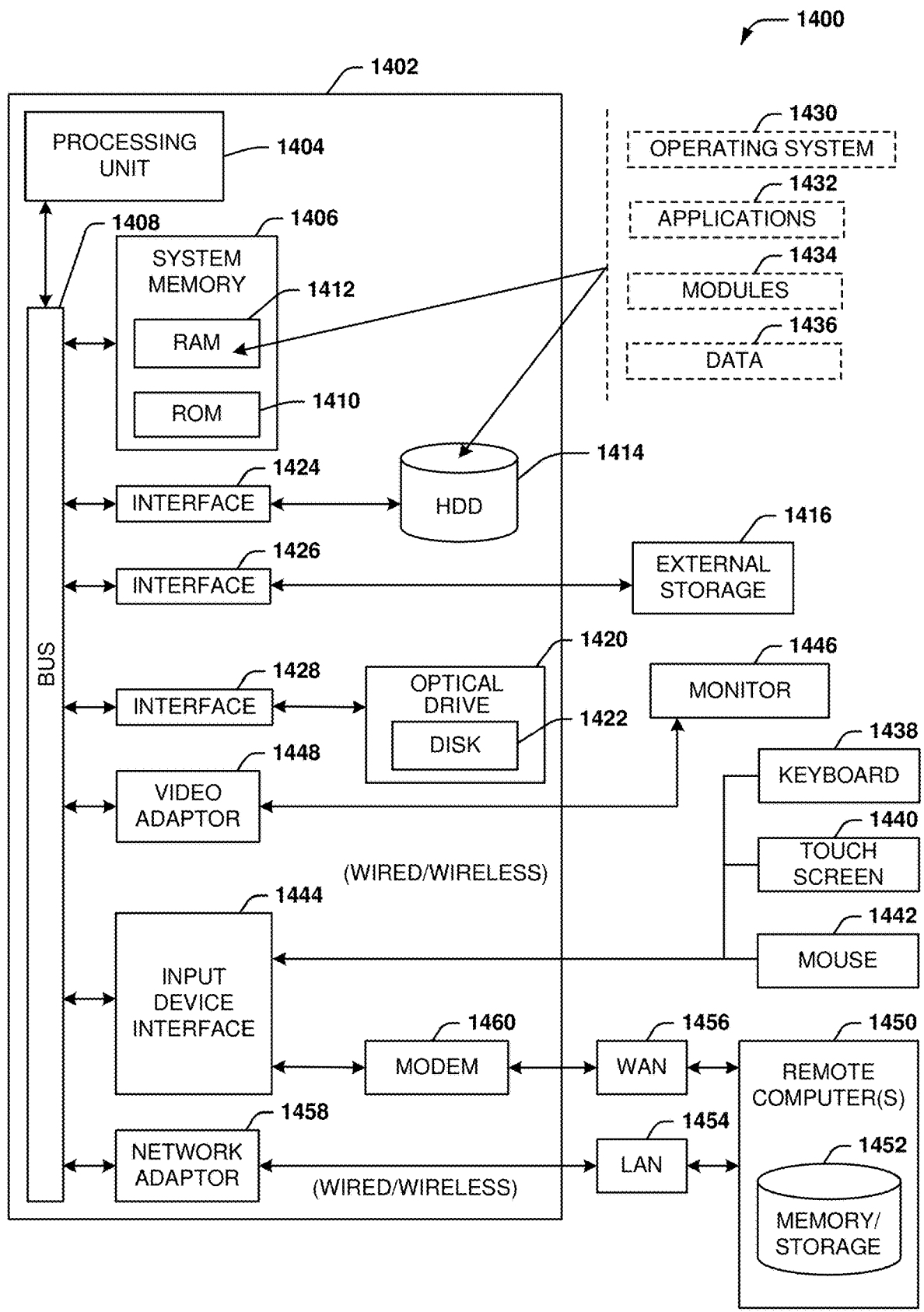
FIG. 14 illustrates a block diagram of an example computer that can be operable to execute processes, operations, and methods in accordance with various aspects and embodiments of the subject disclosure.

In order to provide additional context for various embodiments described herein, FIG. 14 and the following discussion are intended to provide a brief, general description of a suitable computing environment 1400 in which the various embodiments of the embodiment described herein can be implemented. For example, one or more of the devices shown in FIG. 6 can have similar components to that of the computer described in FIG. 14.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure.

For example, disclosed systems and apparatuses and components or subsets thereof (referred to hereinafter as components) should neither be presumed to be exclusive of other disclosed systems and apparatuses, nor should an apparatus be presumed to be exclusive to its depicted components in an example embodiment or embodiments of this disclosure, unless where clear from context to the contrary. Additionally, steps or blocks as shown in example methods, or operations, can be interchangeable with steps or blocks as show in other example methods/operations. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component (s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Therefore, the disclosed subject matter should not be limited to any single embodiment described herein, but rather should be construed in breadth and scope in accordance with the claims below.

What is claimed is:

1. Network equipment, comprising:
a processor; and
a memory that stores executable instructions that, when executed by the processor, facilitate performance of operations, comprising:
accepting a first user input associated with a user identity comprising a data element indicative of an opting to use a network-implemented service that facilitates blocking of unwanted calls;
receiving a second user input associated with the user identity comprising a keyword representing an audible input;
converting the audible input to a converted text input;
rendering the converted text input letter by letter as rendered audio;
based on the rendered audio, facilitating confirmation, associated with the user identity, of the converted text input;
storing the keyword in a repository;
receiving a call from communication equipment directed to a user equipment associated with the user identity;
in response to a presence of the data element, prompting the communication equipment to provide an audible response;
in response to a lack of receipt of the audible response, taking a preventative action relating to the call;
in response to the receipt of the audible response, converting the audible response to text;
retrieving the keyword from the repository and comparing the text to the keyword;
in response to the comparing resulting in a threshold match score being attained, allowing the call to proceed to the user equipment, wherein the threshold match score is determined based on a statistical analysis that generates a statistical score value based on a statistical similarity between the keyword and a variant of the keyword, and wherein the keyword and the variant of the keyword have been verified via a third user input associated with the user identity; and
in response to the comparing resulting in the threshold match score not being attained, facilitating:
taking the preventative action relating to the call, and accepting a selection on a feedback report indicating that the preventative action related to the call should not have been taken.

2. The network equipment of claim 1, wherein the keyword comprises alphanumeric characters entered via the second user input.

3. The network equipment of claim 1, wherein the keyword is received via an audible input, and wherein the keyword is converted from an audible format of the audible input to a text format.

4. The network equipment of claim 1, wherein comparing the text to the keyword comprises comparing the text to the variant of the keyword.

5. The network equipment claim 4, wherein the operations further comprise updating the variant of the keyword to comprise a rejected text.

6. The network equipment of claim 1, wherein facilitating the taking of the preventative action comprises facilitating blocking the call.

7. The network equipment of claim 1, wherein facilitating the taking of the preventative action comprises directing the call to call answering equipment.

8. The network equipment of claim 7, wherein the call answering equipment stores a message related to the call, and wherein the message is accessible by the user equipment.

9. The network equipment of claim 1, wherein the feedback report is accessible by the user equipment.

10. A method, comprising:
accepting, by network equipment comprising a processor, a first user input indicating that a call, directed to a user equipment associated with a user identity, is to be challenged;
receiving, by the network equipment, a second user input comprising a keyword representative of an audible input;
converting, by the network equipment, the audible input to a converted text input;
audibly reading, by the network equipment, the converted text input letter by letter;
based on the audibly reading, facilitating, by the network equipment, confirmation, from a user equipment associated with the user identity, of the converted text input;
facilitating, by the network equipment, storing the keyword in a repository;
receiving, by the network equipment, the call from communication equipment directed to the user equipment;
in response to the first user input, prompting, by the network equipment, the communication equipment to provide an audible response;
in response to the audible response being determined not to have been received within a defined duration of time, facilitating, by the network equipment, preventing the call from connecting with the user equipment;

in response to the audible response being determined to have been received within the defined duration of time, converting, by the network equipment, the audible response to a text;

retrieving, by the network equipment, the keyword from the repository;

comparing, by the network equipment, the text to the keyword;

in response to determining an output of the comparing satisfies a threshold match score, allowing, by the network equipment, the call to proceed to the user equipment, wherein the threshold match score is determined as a function of a statistical score value generated based on a statistical similarity between the keyword and a variant of the keyword, and wherein the statistical similarity between the keyword and the variant of the keyword are confirmed, via a third user input, associated with the user identity; and in response to the determining the output of the comparing does not satisfy the threshold match score, facilitating, by the network equipment;

preventing the call from connecting with the user equipment, and accepting a selection indicating that the preventing the call should not have been facilitated.

11. The method of claim 10, wherein the call comprises a robotic call and the communication equipment comprises robotic dialer equipment.

12. The method of claim 10, wherein comparing the text to the keyword comprises comparing the text to the variant of the keyword.

13. The method of claim 12, further comprising updating, by the network equipment, the variant of the keyword to comprise a rejected text.

14. The method of claim 10, wherein preventing the call from connecting to the user equipment comprises directing the call to call answering equipment that stores a message related to the call, and wherein the message is accessible by the user equipment.

15. The method of claim 10, further comprising transmitting, by the network equipment, a feedback report indicating the details of calls directed to the user equipment.

16. A non-transitory machine-readable medium comprising executable instructions that, when executed by a processor of network equipment, facilitate performance of operations, comprising:

accepting a first user input indicating that a call directed to a user equipment associated with a user identity be challenged;

receiving a second user input comprising a keyword representing an audible input;

converting the audible input to a converted text input;

playing back the converted text input letter by letter as audio;

based on the audio, facilitating a first confirmation, associated with the user identity, of the converted text input;

storing the keyword in a data store;

receiving the call from communication equipment directed to the user equipment;

in response to the first user input being accepted, prompting the communication equipment to provide an audible response;

in response to a lack of a receipt of the audible response, preventing the call from connecting with the user equipment;

in response to the receipt of the audible response, converting the audible response to a text;

retrieving the keyword from the data store, and comparing the text to the keyword, and to a variation of the keyword, the comparing resulting in a match score value, wherein the match score value represents a value associated with a statistically equivalent variant of the keyword;

receiving a second confirmation, via a third user input, that the statistically equivalent variant is the variation of the keyword; and in response to the match score value not satisfying a function of a threshold:

preventing the call from connecting with the user equipment, accepting a selection on a feedback report comprising details related to the call, the selection indicating that the text should have resulted in the match score value satisfying the function of the threshold, and updating the variation to comprise the text.

17. The non-transitory machine-readable medium of claim 16, wherein the call comprises a robotic call and the communication equipment comprises robotic dialer equipment.

18. The non-transitory machine-readable medium of claim 16, wherein the keyword comprises alphanumeric characters that were entered via user input equipment.

19. The non-transitory machine-readable medium of claim 16, wherein the keyword is received via an audible input, and wherein the keyword is converted from an audible format into a text format.

20. The non-transitory machine-readable medium of claim 16, wherein the feedback report comprises a log of calls destined for the user equipment.

* * * * *